(12) United States Patent
Tilagone et al.

(10) Patent No.: US 6,412,472 B1
(45) Date of Patent: Jul. 2, 2002

(54) METHOD FOR CORRECTING IGNITION ADVANCE OF AN INTERNAL COMBUSTION

(75) Inventors: Richard Tilagone, Lyons; Gaétan Monnier, Carriéres-sous-Poissy, both of (FR)

(73) Assignee: Institut Francais du Petrole, Rueil-Malmaison Cedex (FR)

( * ) Notice: Subject to any disclaimer, the term of this patent is extended or adjusted under 35 U.S.C. 154(b) by 0 days.

(21) Appl. No.: 09/720,054
(22) PCT Filed: Apr. 21, 2000
(86) PCT No.: PCT/FR00/01061
§ 371 (c)(1), (2), (4) Date: May 16, 2001
(87) PCT Pub. No.: WO00/65215
PCT Pub. Date: Nov. 2, 2000

(30) Foreign Application Priority Data

Apr. 21, 1999 (FR) ............................................. 99 05075
Feb. 14, 2000 (FR) ............................................. 00 01794

(51) Int. Cl.$^7$ .............................. F02P 5/145; F02P 9/00
(52) U.S. Cl. ................................ 123/406.3; 123/406.44
(58) Field of Search ......................... 123/406.3, 406.26, 123/1 A, 406.44

(56) References Cited

U.S. PATENT DOCUMENTS

| | | | | |
|---|---|---|---|---|
| 4,915,079 A | * | 4/1990 | Holmes | 123/406.24 |
| 5,711,272 A | * | 1/1998 | Maegawa et al. | 123/1 A |
| 5,809,967 A | * | 9/1998 | Masubuchi | 123/406.44 |
| 5,868,117 A | * | 2/1999 | Moote et al. | 123/1 A |
| 5,957,094 A | * | 9/1999 | Krausman et al. | 123/1 A |
| 6,073,611 A | * | 6/2000 | Ohuchi et al. | 123/406.3 |

* cited by examiner

*Primary Examiner*—Erick Solis
(74) *Attorney, Agent, or Firm*—Antonelli, Terry, Stout & Kraus, LLP

(57) ABSTRACT

The present invention is a method of ignition advance correction of an internal-combustion engine according to the composition variation of the natural gas contained in a tank and supplying the engine. A methane number relative to the natural gas filling the tank is determined and an ignition advance correction value is deduced from the number. According to the invention, a correlation is established between the methane number described above, an air-fuel ratio R for a stoichiometric combustion and the gas flow variation required to reach a reference working point of the engine after the composition variation of this gas.

22 Claims, 2 Drawing Sheets

METHOD FOR CORRECTING IGNITION ADVANCE OF AN INTERNAL COMBUSTION

BACKGROUND OF THE INVENTION

1. Field of the Invention

The present invention relates to the field of spark-ignition engines fed with natural gas or with another power gas.

2. Description of the Prior Art

A problem inherent in spark-ignition engines lies in the wide range of natural gases available through the sales networks. In fact, great variations in the composition of the gases that are marketed have been observed. These gases can either correspond to the native gas or consist of a mixture of identified and known gases.

Therefore, although the composition of the gases available on the networks necessarily meets the standards of the countries where they are marketed, there are however great differences between two distributing points in one country; there are also differences between the distributions of different countries.

Furthermore, the composition of the gas delivered by a station can vary according to the period of the year; this is due to the supply variations of the stations.

Vehicles running on natural gas (NG) must however be supplied anywhere and anytime without any engine running problems.

These problems are already mentioned for example in U.S. Pat. No. 5,537,854 which describes a piezoelectric device allowing knock phenomena to be linked with the acoustic properties of the fuel (NG).

It is therefore necessary to know and/or to estimate the composition of the natural gas with which a given engine is supplied because the composition influences the running conditions of the engine, notably as regarding engine knock.

In fact, it is well-known that engine knock is correlated with the methane number (IM) of the gas, which itself depends on the composition of the gas, which directly influences the appearance of engine knock. Thus, if the methane number of a natural gas is known with sufficient precision, it will be possible, notably from engine maps, to deduce a corrective ignition advance value allowing the optimum ignition advance to be used in order to prevent knock phenomena or to allow optimum combustion adjustment.

A suitable engine tuning can thus be found.

Extensive research has already been carried out into natural gas characterization. Complex analysis systems have been described, for example in U.S. Pat. No. 5,333,591. According to this prior art, a device which analyzes of the composition of the natural gas, associated with a control unit, allows the engine to be tuned. This analysis is based here on the thermal conductivity of the gas.

It is also possible to use a chromatographic analysis to determine the composition of the natural gas. However, this solution is expensive and quite difficult to apply in a mobile and limited environment.

SUMMARY OF THE INVENTION

The present invention provides optimum engine running conditions regarding ignition advance, without risk of knocking. The invention improves the combustion while ensuring notably an optimum combustion velocity. The appearance of engine knock is advantageously prevented by decreasing the ignition advance as soon as required.

Furthermore, the present invention provides control of ignition advance without the engine having to run in the knock zones, notably the initial knock zones.

The present invention provides, from at least one working point of the engine or reference point, a determination of the variation of a quantity linked with the variation of the flow of power gas entering the engine, these variations resulting from the change in the characteristics of the power gas, and from the variation of this quantity, determining the ignition advance correction to be applied at various working points of the engine.

The quantity linked with the variation of the flow of power gas can be the flow of gas itself It is possible, from this variation and from the air/power gas ratio of the mixture supplying the engine, to determine the stoichiometric air mass quantity to power gas mass quantity ratio corresponding to said power gas.

Finally, the ignition advance correction can be determined according to this stoichiometric ratio.

In particular, the present invention is a method of ignition advance correction of an internal-combustion engine according to the composition variation of the power gas, notably of the natural gas contained in a tank and supplying the engine. A methane number relative to the natural gas filling the tank is determined and an ignition advance correction value is determined from the number. A correlation is established according to the invention between the methane number described above, an air/fuel ratio R for a stoichiometric combustion and the variation of the flow of gas required to reach a reference working point of the engine after the composition variation of this gas.

More precisely, the following operations are carried out:
a) determining the gas flow variation required to reach a reference working point of the engine after the composition variation of this gas;
b) calculating, from this flow rate variation, a methane number (IM) relative to the natural gas filling said tank;
c) deducing an ignition advance correction value from said number IM; and
d) correcting the ignition advance.

A method according to the invention calculates a methane number relative to the natural gas filling the tank, then in correlating the methane number with an ignition advance correction value by means of a predetermined correspondence table, or in applying a given correction if the calculated number is below a predetermined value.

An air/fuel ratio R for stoichiometric combustion conditions depends on the composition of the natural gas in the tank of the vehicle. It has been found, within the scope of the present invention, that it is possible to establish a correlation between this ratio and the methane number described above.

Furthermore, the engine control unit can permanently quantify, according to the present invention, the effect of a variation of ratio R after a composition variation of the natural gas in the tank of a vehicle.

A suitable engine tuning can thus be found if the stoichiometric air/fuel ratio of the natural gas contained in the tank is permanently known.

More specifically, the methane number is thus calculated according to the air/fuel ratio (R) for a stoichiometric combustion. As already mentioned, ratio R depends on the chemical composition of the gas and it is therefore likely to change according to different tanks. More generally, this ratio changes as soon as the composition of the gas contained in the tank changes, i.e. when the composition of the fuel injected into the tank is different from that of the fuel previously present in the tank.

More precisely, ratio (R) is determined wherein (R(1)) is the ratio determined before filling the tank and (R(2)) is the ratio determined after filling the tank, and a flow of gas Q(1) before filling is determined and a flow of gas Q(2) after filing is determined, for the same working point of the engine. Ratio (R(1)) relative to the previous tankful and flow rate (Q(1)) are known because they are continuously stored in the computer memory. Significant variations in the gas compositions between two successive tankfuls thus correspond to notable variations between gas flows (Q(1)) and (Q(2)), thus between ratios (R(1)) and (R(2)). For the same reference working point of the engine (constant set air/fuel ratio and constant engine speed), it has been found that the stoichiometric Q air/Q fuel (gas) ratio corresponding to the gas contained in the tank is inversely proportional to the flow rate of this gas.

It is therefore possible to calculate the ratio R(2) from the difference of the inverse of the flow rates (1/Q(2))−(1/Q(1)) multiplied by a first constant Ki, a value to which ratio R(1), i.e. determined for the previous tankful, is added.

It has also been found in the present invention that it is possible to determine, in a surprisingly simple way, the methane number IM of the gas contained in the tank by multiplying ratio R(2) by a second constant K2 and by taking a third constant K3 away from the product. Values K2 and K3 can for example be determined according to the nature of all the gases likely to be used in a given place or country.

BRIEF DESCRIPTION OF THE DRAWINGS

Other features, details and advantages of the present invention will be clear from reading the description hereafter, given by way of non limitative example, with reference to the accompanying drawings wherein.

DETAILED DESCRIPTION OF THE PREFERRED EMBODIMENTS

The organization described hereafter provides an ignition advance correction factor C which produces optimum running conditions for the engine, without engine knocking, whatever the composition of the gas supplying the engine.

It is well-known that the very good behavior of natural gas regarding engine knocking contributes to reaching an optimum engine tuning. The physico-chemical parameter permitting this ability to be obtained is the methane number IM which depends on the composition of the gas.

This methane number can be estimated from an experimental correlation for a series of reference gases, by taking account of the most influential chemical species.

Figure 1:
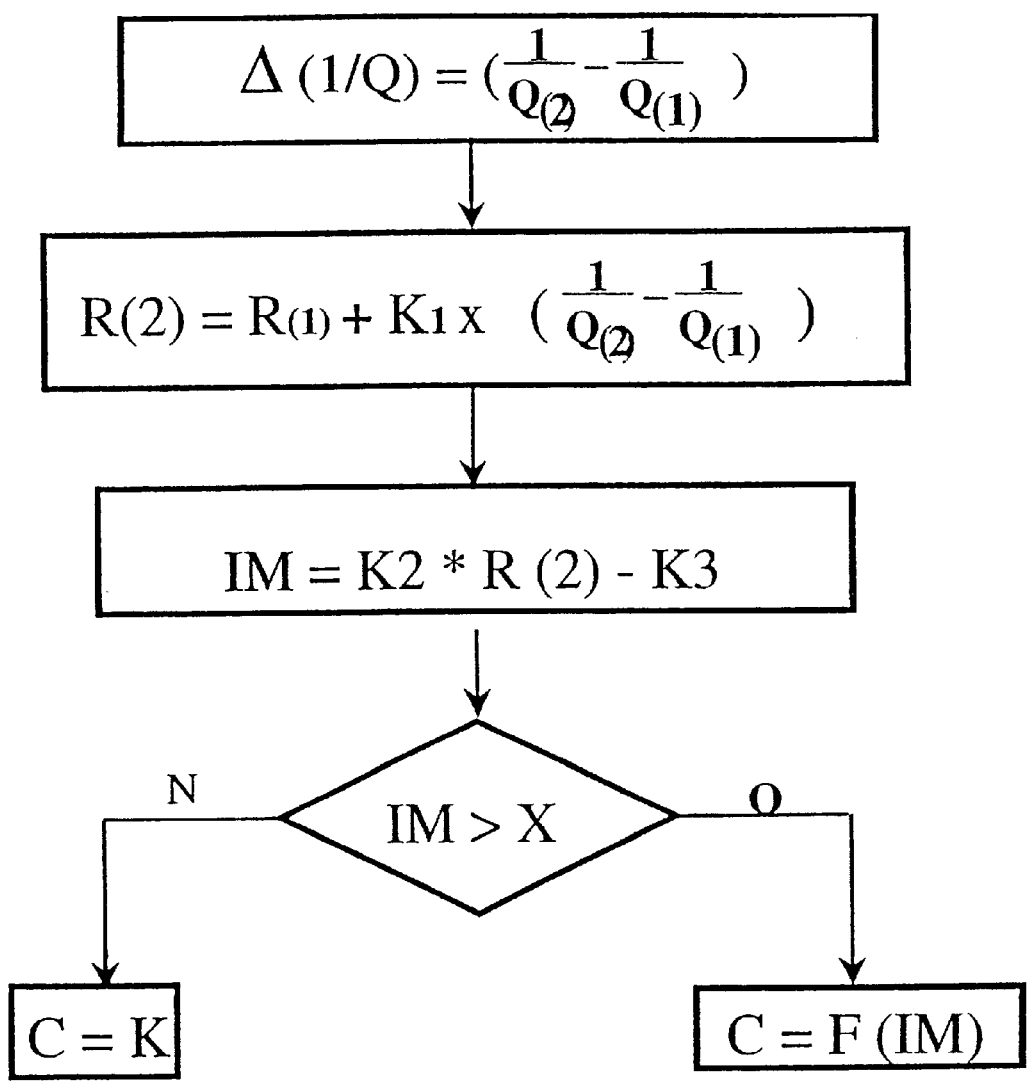
FIG. 1 is a flowchart of the method according to the invention.

The method according to the invention comprises a particular calculation of methane number IM as explained hereafter in connection with FIG. 1.

The calculation can be initiated from known values R(0), Q(O) defined as standards for each working point of the engine or reference point. An engine working point can be conventionally defined by the rotating speed of the engine and by the load of the engine. This load can notably be defined by the pressure prevailing in the inlet manifold, by the throttle position, After filling the vehicle with natural gas, the composition of the gas contained in the tank has probably varied for the reasons explained above.

When the vehicle is used thereafter, the computer stores the new flow of gas required to reach the reference working point and to meet the set mixture strength.

It is in fact necessary to vary the flow of gas in order to reach the set mixture strength for this reference working point. This flow variation leads to a variation of the air/fuel ratio (R) for the stoichiometric conditions. According to the present invention, and for a given working point of the engine, the relationship exists:

$$R(1)=K1/[Q(1)] \text{ and } R(2)=K1/[Q(2)].$$

Q(2) and Q(1) can be determined by measurement,

K1 being a known given constant,

R(1) being the ratio stored before filling,

R(2), which is the final ratio after filling which is deduced from the following relationship:

$$R(2) = R(1) + K1 \times \left(\frac{1}{Q(2)} - \frac{1}{Q(1)}\right)$$

The methane number IM of the gas contained in the tank is then determined by means of the formula as follows:

$$IM=K2*R(2)-K3.$$

A corrective ignition advance value is thus applied according to the value of the calculated methane number IM.

Figure 2:
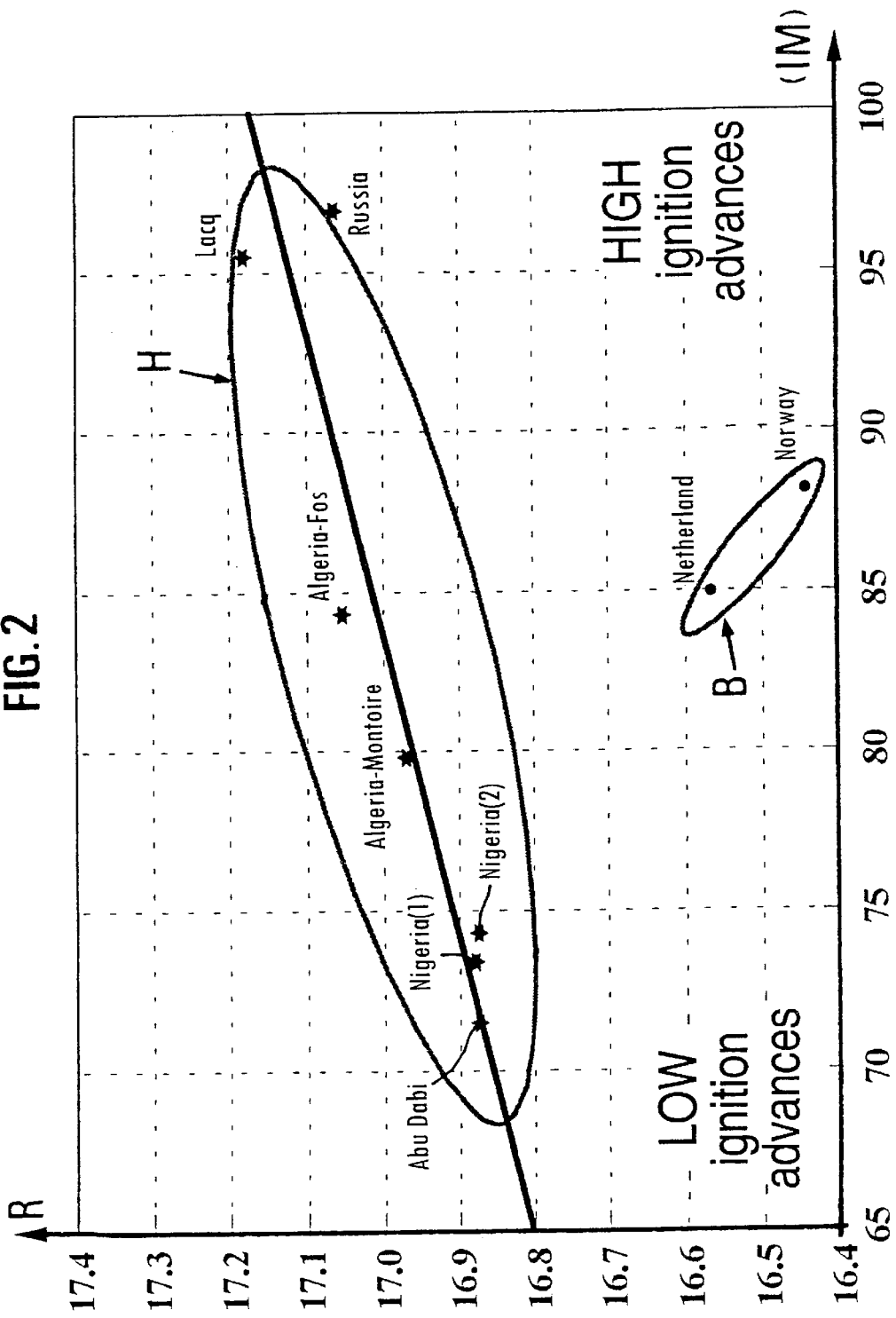
FIG. 2 gives a characteristic of different gases by means of their ratio R according to the calculated methane number IM.

By way of example, the line shown in FIG. 2 was obtained with K2=95 and K3=1535.

It appears that "H" type gases are scattered around the line and therefore that there is a good correlation.

However, for some gases such as Netherland or Norway gases of type "B", the calculated methane number is very far from the curve. A specific processing is therefore applied if the calculated value TM is less than or equal to a certain predetermined value X.

Application of the aforementioned correlation formula would give a very low IM number, of the order of 35, so that the corresponding advance reduction would be unsuitable for the engine. Furthermore, it has been established during tests that the higher the proportion of inert material in the natural gas, the lower the combustion velocities, all other things being equal. For these gases, the suitable corrective action thus consists in increasing the ignition advances in order to limit the combustion lag in the cycle instead of reducing ignition advance. A fixed correction (C=K) is applied in these cases.

For the other gases, whose IM number is above the value X, a correction C is applied according to a correspondence table C=f(IM) belonging to engine maps.

More generally, low ignition advances will be applied for low IM numbers and conversely.

Value X was selected equal to 60 in the tests carried out by the assignees. This value is purely illustrative and in no way limitative.

A particular embodiment of the method according to the invention is described hereafter.

1) Waiting for the engine to reach the reference working point;
   Remarks:
   a—the reference point is the engine working point at which the strategy described will be applied;
   b—the reference point is perfectly defined and without ambiguity by the air mass flow rate (Qair) and the engine speed;

c—several reference points can perfectly be considered for example in order to carry out cross-checks according to strategies which remain to be defined. However, a reference point must be selected according to the possible repeatability level to be reached in order to guarantee the reliability of this strategy (beware of running without mixture strength loop control);

2) Determination by measurement of the rotating speed (speed detector on ring gear) and of the load (manifold pressure, throttle position, . . . ) is systematically performed on standard engines and it is therefore permanently available;

3) Determination of the air flow rate of the reference point, by calculation (the cylinder capacity, the speed, the filling according to the load, the thermodynamic conditions at the intake are known) or by reading an engine map if available;

4) From the mixture strength formula, at the same reference point, the relationship exists:

Qgas*RAFST=Qair*mixture strength=cte.

In this example, RAFST is the stoichiometric air/fuel mass ratio and TMTFP is the calculated methane number.

Storage of the initial conditions [1]:
Before filling the tank, [1], the computer has stored Qgas[1] and RAFST[1].
Determination of Qgas[2] after filling:
In order to reach the set mixture strength, the engine control will adjust the injection time Ti[2] from which it is possible to know Qgas[2].
Test:
If Qgas[2]–Qgas[1]<epsilon, a small number to be defined, nothing is done, otherwise continue.
Determination of RAFST[2]:
RAFST[1]*Qgas[1]=RAFST{2]*Qgas[2]
RAFST[2]=RAFST[1]*Qgas[1]/Qgas[2].
Determination of IMIFP[2]:
The following relation has been established for a natural gas pool selected as the reference:
IMIFP=K2*RAFST+K3
IMIFP[2]=K2*RAFST[2]+K3.
Test:

| If calculated IMIFP[2] >60 (gas type "H") Application of the advance correction correction: f(IMIFP) to be defined | If calculated IMIFP[2] <60 (gas type "B") Application of the advance correction for gas B with real methane number - 85 |
|---|---|

The advance correction is adjusted according to IMIFP. These corrections according to IMTFP may have been predetermined by means of tests during engine tuning.

According to the invention, it is possible to use one or more reference points.

The reference point is preferably selected in a common engine operating range, for example at idle speed. Idle speed also has the advantage of having well-adjusted air flow rates, which facilitates determination of the different values required for implementing the invention.

It is possible, according to the method, to measure the fuel variations between two tankfuls, but this is also possible in relation to characteristics of an initial fuel. Similarly, the method according to the invention can be implemented continuously or intermittently without waiting for a new tank filling.

What is claimed is:

1. A method of ignition advance correction of an internal-combustion engine running on a power gas, comprising: determining at least one reference working point of the engine, a variation of a quantity linked with a flow rate variation of the power gas entering the engine and an ignition advance correction from a variation of ignition advance; and wherein the quantity linked with the flow rate variation of the power gas is the flow of the power gas;

from variation of the flow of the power gas and from a mixture strength of a fuel/gas mixture supplying the engine, a stoichiomentric air mass quantity to power gas mass quantity ratio corresponding to the power gas is determined; and the ignition advance correction is determined according to the ratio.

2. A method as claimed in claim 1, wherein:
the at least one reference working point of the engine corresponds to a working point of the engine at idle speed.

3. A method as claimed in claim 1, wherein:
the at least one reference working point is plural reference points of the engine.

4. A method as claimed in claim 2 wherein:
the at least one reference working point is plural reference points of the engine.

5. A method of ignition advance correction of an internal-combustion engine according to variation in composition of natural gas contained in a tank and supplied to the engine, comprising:

a) determining a gas flow variation of the natural gas required to reach a reference working point of the engine after the variation of the composition of the natural gas;

b) calculating, from the flow rate variation, a methane number (IM) relative to the natural gas filling the tank;

c) determining an ignition advance correction value from the number IM; and d) correcting the ignition advance.

6. A method as claimed in claim 5, wherein:
the methane number (IM) is calculated according to an air/fuel ratio (R) for a stoichiometric combustion.

7. A method as claimed in claim 6, wherein for the ratio (R) wherein (R(1)) is the ratio determined before filling the tank and (R(2)) is the ratio determined after filling the tank, and a flow of natural gas (Q(1)) before filling the tank is determined and a flow of natural gas (Q(2)) after filling the tank, for a same working point of the engine, is determined.

8. A method as claimed in claim 7, wherein:
(R(2)) is calculated from a difference of an inverse of the flow rates (1/Q(2)–1/Q(1)) multiplied by a first constant K1, and a value to which ratio (R(1)), determined for a previous tankful is added.

9. A method as claimed in claim 8, wherein:
the methane number (IM) is determined by multiplying ratio (R(2)) by a second constant K2 to produce a product and by subtracting a third constant K3 away from the product.

10. A method as claimed in claim 9, wherein:
the values K2 and K3 are determined according to a characteristic of gases available in place or country.

11. A method as claimed in claim 5, wherein:
the at least one reference working point of the engine corresponds to a working point of the engine at idle speed.

12. A method as claimed in claim 6, wherein:

the at least one reference working point of the engine corresponds to a working point of the engine at idle speed.

13. A method as claimed in claim 7, wherein:

the at least one reference working point of the engine corresponds to a working point of the engine at idle speed.

14. A method as claimed in claim 8, wherein:

the at least one reference working point of the engine corresponds to a working point of the engine at idle speed.

15. A method as claimed in claim 9 wherein:

the at least one reference working point of the engine corresponds to a working point of the engine at idle speed.

16. A method as claimed in claim 10 wherein:

the at least one reference working point of the engine corresponds to a working point of the engine at idle speed.

17. A method as claimed in claim 5, wherein:

the at least one reference working point is plural reference points of the engine.

18. A method as claimed in claim 6, wherein:

the at least one reference working point is plural reference points of the engine.

19. A method as claimed in claim 7, wherein:

the at least one reference working point is plural reference points of the engine.

20. A method as claimed in claim 8, wherein:

the at least one reference working point is plural reference points of the engine.

21. A method as claimed in claim 9 wherein:

the at least one reference working point is plural reference points of the engine.

22. A method as claimed in claim 10 wherein:

the at least one reference working point is plural reference points of the engine.

* * * * *